(12) United States Patent
Hodroj (10) Patent No.: US 9,992,065 B2
(45) Date of Patent: Jun. 5, 2018

(54) SELECTIVE WI-FI CALLING ROUTER UPDATES

(71) Applicant: T-Mobile, USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 196 days.

(21) Appl. No.: 14/970,216

(22) Filed: Dec. 15, 2015

(65) Prior Publication Data

US 2017/0171018 A1 Jun. 15, 2017

(51) Int. Cl.
*H04L 12/24* (2006.01)
*H04L 29/08* (2006.01)

(52) U.S. Cl.
CPC .......... *H04L 41/082* (2013.01); *H04L 67/303* (2013.01)

(58) Field of Classification Search
CPC . H04L 41/082; H04L 65/1069; H04L 67/303; H04B 7/2121; H04B 7/2123; H04J 2203/0069; H04Q 2213/394; H04W 72/04; H04W 72/12; H04W 76/00
USPC ........................................................ 370/329
See application file for complete search history.

(56) References Cited

U.S. PATENT DOCUMENTS

| | | | | |
|---|---|---|---|---|
| 7,747,995 B2 * | 6/2010 | Fritsch | ...................... | G06F 8/65 709/203 |
| 8,351,934 B1 * | 1/2013 | Schmitt | ............. | H04M 3/42178 455/419 |
| 2004/0064812 A1 * | 4/2004 | Tachiyama | ................. | G06F 8/65 717/170 |
| 2008/0189693 A1 * | 8/2008 | Pathak | ....................... | G06F 8/65 717/168 |
| 2010/0049606 A1 * | 2/2010 | Trzybinski | ......... | G06Q 30/0255 705/14.53 |
| 2011/0173599 A1 * | 7/2011 | Ohama | ...................... | G06F 8/65 717/168 |
| 2012/0198435 A1 * | 8/2012 | Dirstine | .................... | G06F 8/65 717/173 |
| 2012/0218917 A1 * | 8/2012 | Komarevtsen | ...... | H04L 41/0843 370/254 |
| 2012/0257491 A1 * | 10/2012 | Mongeau | ............ | H04L 41/0668 370/216 |
| 2012/0317224 A1 * | 12/2012 | Caldwell | ............... | H04L 45/745 709/217 |
| 2014/0105111 A1 * | 4/2014 | Karaoguz | ............. | H04H 20/57 370/328 |

(Continued)

*Primary Examiner* — Robert Lopata
(74) *Attorney, Agent, or Firm* — Han Santos, PLLC (57) ABSTRACT

Routers that are provided by a wireless communication carrier to users may be selectively provisioned with different router updates. A server may receive a router update request for a router. The router may be offered by a wireless carrier network for providing Wi-Fi calling to user devices. The server may retrieve a router profile for the router from a router profile database of the wireless carrier network based on a router identifier included in the router update request. The server may determine whether a router update for the router is available from a router update store of the wireless carrier network based on one or more router parameters in the router profile. The server may distribute the router update to the router in response to a router update being available from the router update store of the wireless carrier network.

20 Claims, 7 Drawing Sheets

(56) References Cited

U.S. PATENT DOCUMENTS

| | | | |
|---|---|---|---|
| 2014/0155705 A1* | 6/2014 | Papadopoulos | G06F 19/3481 600/301 |
| 2014/0173063 A1* | 6/2014 | Jeong | H04L 12/2827 709/220 |
| 2014/0366012 A1* | 12/2014 | Jamadagni | H04W 8/245 717/171 |
| 2015/0245182 A1* | 8/2015 | Scagnol | H04L 43/0817 370/312 |
| 2016/0062760 A1* | 3/2016 | Zhang | G06F 8/65 717/170 |
| 2016/0119182 A1* | 4/2016 | Brown | G06Q 10/063 370/252 |
| 2016/0371074 A1* | 12/2016 | Vyas | H04W 4/005 |
| 2017/0075676 A1* | 3/2017 | Li | G06F 8/71 |
| 2017/0126554 A1* | 5/2017 | Fan | H04L 45/563 |
| 2017/0172463 A1* | 6/2017 | Papadopoulos | A61B 5/1112 |
| 2017/0223513 A1* | 8/2017 | Salvador | H04B 17/318 455/456.1 |

\* cited by examiner

SELECTIVE WI-FI CALLING ROUTER UPDATES

BACKGROUND

Mobile devices are integral to the daily lives of most users. Mobile devices are used to make voice calls, check email and text messages, update social media pages, stream media, browse websites, and so forth. As a result, users of mobile devices expect a mobile telecommunication carrier to provide constant and reliable telecommunication and data communication services at all times.

The reliability of telecommunication and data communication services may be affected by multiple factors, such as geography and terrain, device features and capabilities, as well as network infrastructure and network coverage deployment. In some instances, a wireless telecommunication carrier may provide users who are experiencing network coverage issues with Wi-Fi calling capable routers. Such Wi-Fi calling capable routers are designed to enable mobile devices to make and receive phone calls via available broadband Internet connections. Following the distribution of the routers to the users, the wireless telecommunication carrier may desire to provide software updates to the routers in order to ensure optimal performance. For example, the software updates may speed up the performance of the router, provide new router features, remedy security vulnerabilities, cure incompatibilities with user devices, and/or other fix other performance issues.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for selectively providing different router updates to specific groups of routers. The routers may be Wi-Fi calling capable routers that are provided by a wireless telecommunication carrier to subscribers that are experiencing network coverage issues. A user device may be a smart phone, a feature phone, a tablet computer, or another portable communication device. A specific group of routers may include routers that share common geolocation parameters, device parameters, possessory parameters, and/or so forth. For example, a geolocation parameter shared by the routers may be that the routers are being used in a specific city, a specific state, or a specific market. A device parameter shared by the routers may be that the routers have a common firmware version, a common device model, or a common hardware version. Likewise, a possessory parameter shared by the routers may be that the routers are leased by the users from the wireless telecommunication carrier.

In various embodiments, a router management engine of the wireless carrier network may selectively provide a specific group of routers with a particular router update that is tailored for the group. In contrast, other routers that do not belong to the group are not provided with the particular router update. The router update may include a new firmware update for the routers, a feature update that enables or disables one or more features of the routers, a security update that disables the functionalities of the routers in their entirety, and/or so forth. Such selective provision of router updates to different groups of routers may be contrasted with conventional updating techniques that simply provide a single generic update to all routers.

The selective provisioning of specific groups of routers with different router updates may enhance router security, provide differentiated router-based services for different users, and enable a wireless communication carrier to provide competitive router-based features in specific markets while minimizing overall operating costs. The enhancement of router services and router security may reduce customer service support cost and time, as well as increase customer satisfaction and customer retention. The techniques described herein may be implemented in a number of ways. Example implementations are provided below with reference to the following figures.

Example Network Architecture

Figure 1:
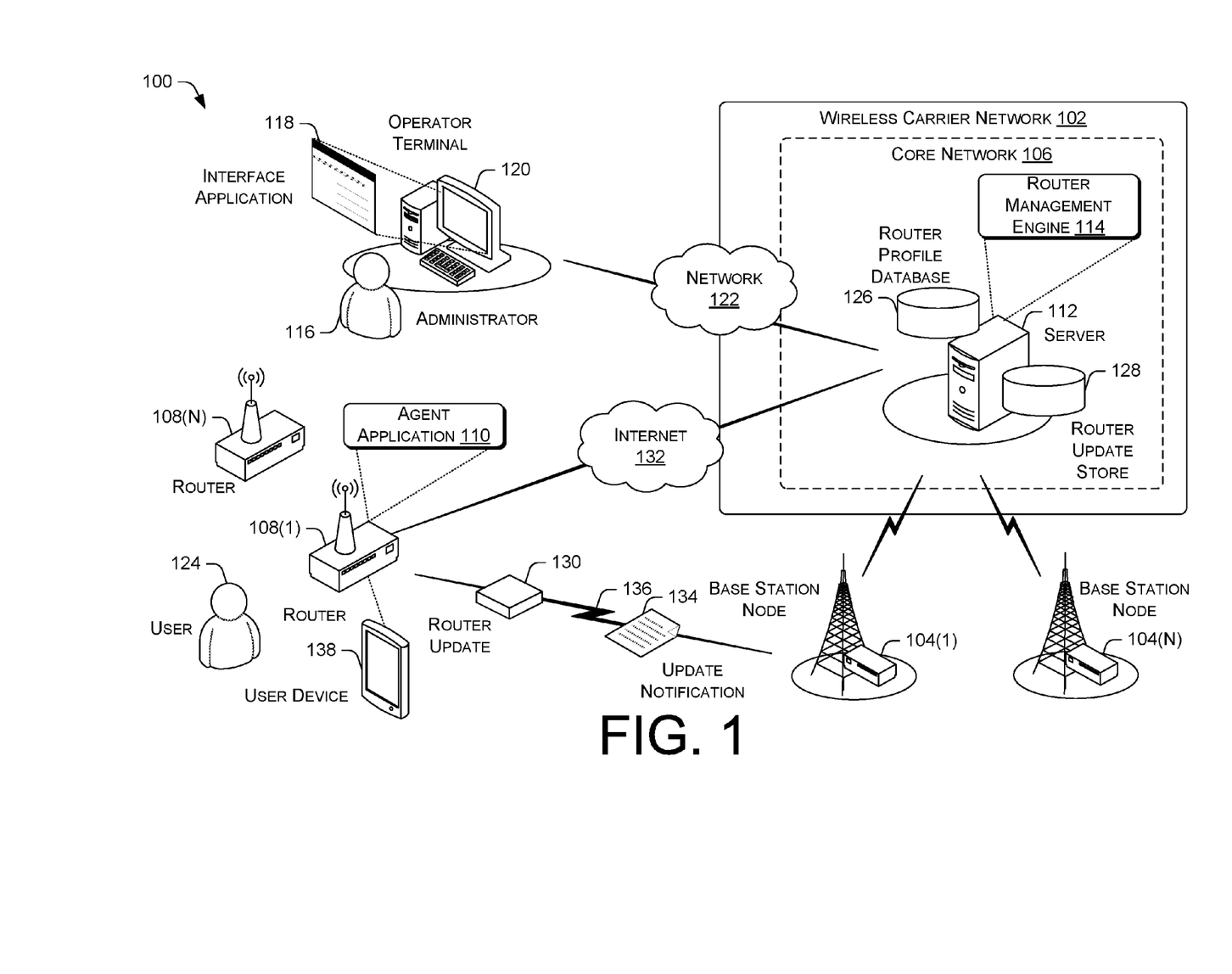
FIG. 1 illustrates an example network architecture for implementing selective updates for Wi-Fi calling capable routers.

FIG. 1 illustrates an example network architecture 100 for implementing selective updates for Wi-Fi calling capable routers. The architecture 100 may include a wireless carrier network 102. The wireless carrier network 102 may be operated by a wireless communications carrier. The wireless carrier network 102 may include base station nodes 104(1)-104(N), as well as a core network 106. The base stations 104(1)-104(N) are responsible for handling voice and data traffic between user devices, such as routers 108(1)-108(N), and the core network 106. Alternatively, the router 108(1) may access the core network 106 via other communication networks of the wireless communication carrier, third-party providers that connect to the core network, or the Internet. The router 108(1) may be a Wi-Fi capable router that is designed to enable user devices, such as a mobile phone, to make and receive phone calls via an available broadband Internet connection.

In some embodiments, each of the routers 108(1)-108(N) are provided with an agent application. For example, an agent application 110 may be preinstalled on the router 108(1). The agent application 110 may periodically check for router updates from the wireless carrier network 102. Alternatively or concurrently, the agent application 110 may be configured to receive update available notifications and router updates from the wireless carrier network 102. The update available notifications may indicate that new router updates are available for the router 108(1).

The core network 106 may provide telecommunication and data communication services to the user devices. For example, the core network 106 may connect the routers 108(1)-108(N) to other telecommunication and data communication networks. In various embodiments, the core network 106 of the wireless carrier network 102 may be equipped with one or more server 112. The server 112 may host a router management engine 114 that is responsible for selectively distributing router updates to different groups of routers.

The router management engine 114 may be accessible to an administrator 116 via an interface application 118 at an operator terminal 120. The operator terminal 120 may be connected to the server 112 via a network 122. In various embodiments, the operator terminal 120 may be a laptop computer, a desktop computer, a tablet computer, or any other networked computing device that is processing inputs to generate outputs. The network 122 may be any secured LAN, WAN, or other network that is access controlled through the use of user authentication, data encryption, or access control technologies. For example, the network 122 may be a firewalled Intranet or a Virtual Privacy Network (VPN) that is solely accessible to authorized employees of the wireless communication carrier that operates the wireless carrier network 102.

The interface application 118 may enable the administrator 116 to select specific groups of routers to receive particular router updates. In various embodiments, a group of routers may be selected based on one or more common parameters that are shared by the routers. The parameters may include geolocation parameters, device parameters, account parameters, and possessory parameters. For example, a geolocation parameter may be that the routers are being used in a specific city, a specific state, or a specific market. A device parameter may be a device model, a device firmware version, a device hardware revision, or a device identifier of the router. For example, the device identifier may be an electronic serial number, an international mobile subscriber identity (IMSI) number, or a media access control (MAC) address of the device.

An account parameter may be a parameter for an account of a user, such as the user 124, who is using a router. For example, the account parameter may be whether the account is a prepaid customer account or a postpaid customer account. In another example, the account parameter may indicate whether a user using a router is up-to-date or behind on the recurring payments of service fees to the wireless communication carrier that operates the wireless carrier network 102. In an additional embodiments, the account parameter may be a telephone number that is associated with the account. The possessory parameters may indicate whether the router is a leased router or that the router has been purchased by the user 124. In some instances, the possessory parameters may further indicate the payment terms associated with the lease or the purchase.

Accordingly, the administrator 116 may enter a query into the interface application 118 that includes the one or more parameters. In the instance of parameters such as telephone numbers and MAC address, the administrator 116 may enter a range of values. In turn, the router management engine 114 may search a router profile database 126 for one or more routers that match the query parameters. In various embodiments, the router profile database 126 may store device information of the routers that are deployed by the wireless communication carrier. The device information may include information that are accessed from third-party device information databases, such as the information databases of router manufacturers. The router profile database 126 may further include associated account information on users who are using the routers. In various embodiments, the router profile database 126 may be periodically or continuously updated with information from a billing and accounts engine of the wireless carrier network 102. Accordingly, the administrator 116 may select specific groups of routers to receive router updates.

The router update store 128 may store router updates that are tailored for different groups of routers. For example, the router update store 128 may contain a router update for a group of routers that are deployed within a specific city. In another example, the router update store 128 may contain a router update for routers that belong to users with postpaid customer accounts. In various embodiments, the administrator 116 may use the interface application 118 to assign a specific router update to each groups of routers that meet one or more parameters. Accordingly, once a specific group of router is identified via a query, the administrator 116 may use the router management engine 114 to distribute a corresponding router update to the one or more routers in the group.

The router management engine 114 may use one of multiple ways to distribute a router update, such as the router update 130, to a group of routers. In some instances, the routers in a group, such as the routers 108(1)-108(N) may be configured to periodically check for router updates from the router management engine 114 via the Internet 132. Accordingly, each of the routers in the specific group may download the router update at a predetermined scheduled time. In other instances, the router management engine 114 may send notifications to the specific group of routers. Accordingly, the routers in the specific group may automatically download the router update in response to the notifications. Alternatively, the routers in the specific group may display visual and/or audio cues via one or more indicator lights or speakers to show that the router update is available in response to the notifications. The visual and/or audio cues may prompt the users of the routers to initiate the downloading of the router update from the router management engine 114. However, if a user fails to initiate a download of the router update to such a router within a predetermined time period, the router may automatically initiate the download the router update.

Alternatively, the router management engine 114 may communicate the update available notifications (e.g., update available notification 134) to a group of routers using various communication channels. In some implementations, the router management engine 114 may send a push notification to a router that via the Internet 132, the push notification may include a network location for use by the router to download the router update. For example, the network location may be in the form of a network address or a uniform resource locator (URL). In other implementations, a router may be a subscriber identity equipped module (SIM)-equipped router that has a cellular communication connection 136 to the wireless carrier network 102. For example, the cellular communication connection 136 may be a 3G connection, a 4G connection, a (Long-Term Evolution) LTE connection, or some other type of communication connection. In such implementations, the router management engine 114 may send the update available notification as a text message, such as a short messaging service (SMS) message, to the router via the cellular communication connection. The text message may include a network location for use by the router to download a router update.

In alternative implementations, the router management engine 114 may send the update available notification for a router as a text message to a user device 138 that is known to be associated with the router. For example, the user device 138 may belong to a user that also leases or owns the router 108(1). The text message may include a link to a network location on the wireless carrier network that contains a corresponding router update. In such implementations, the router update may include an installer that is configured to install the router update to a router that is communicatively coupled to the user device. Accordingly, the user device 138 may download the router update from the network location. Subsequently, the user may connect the user device 138 to the router 108(1) via a wired or wireless communication connection, such as a universal serial bus (USB) connection. The installer associated with the router update may then install the router update onto the router via the communication connection.

Example User Device Components

Figure 2:
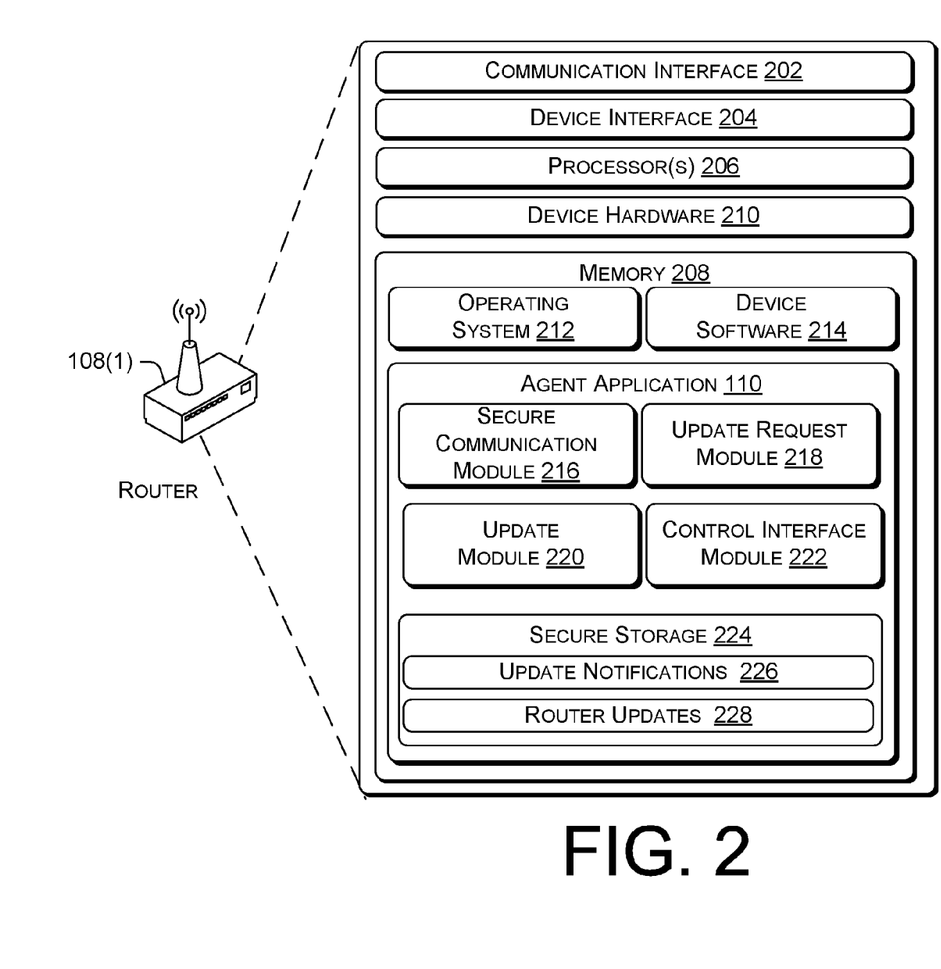
FIG. 2 is a block diagram showing various components of a router that receives selective router updates from a server of a wireless carrier network.

FIG. 2 is a block diagram showing various components of a router that receives selective router updates from a server of a wireless carrier network. The router 108(1) may be equipped with a communication interface 202, device interface 204, one or more processors 206, memory 208, and other device hardware 210.

The communication interface 202 may include wireless and wired communication components that enable the router 108(1) to send data to and receive data from user devices, such as the user device 138. In various embodiments, the wireless communication components may include a Wi-Fi transceiver. The Wi-Fi transceiver may include a wireless network interface controller (NIC) and a Wi-Fi radio.

The wired communication components may include an Ethernet interface, a USB interface, or other I/O interfaces. The Ethernet interface may provide a way for the router 108(1) to connect to the server 112 via the Internet 132. The router 108(1) may use the USB interface to connect with a user device, such as the user device 138. However, the USB interface may be substitute with any other I/O interface that is supported by a user device.

The device interface 204 may enable a user to provide inputs and receive outputs from the router 108(1). The device interface 204 may include a data output device (e.g., visual display, audio speakers, tone generators, indicators lights, etc.). Each of the processors 206 may be a single-core processor, a multi-core processor, a complex instruction set computing (CISC) processor, or another type of processor. The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 210 may include other hardware that is typically located in router. For example, the device hardware 210 may include a power source, signal converters, antennas, hardware decoders and encoders, digital signal processors (DSPs), graphic processors, a SIM card slot, modem, and/or the like that enable the router 108(1) to execute applications and provide telecommunication and data communication functions. A SIM card may be inserted into the SIM card slot of the router 108(1). The SIM card may contain subscriber identification information and the SIM carrier code. Accordingly, the SIM card may enable the router 108(1) to obtain telecommunication and/or data communication services from the wireless carrier network 102. The device hardware 210 may further include an antenna interface controller, a network interface controller, and/or a USB controller. The antenna interface controller may be used by the processors 206 to transmit and receive data through radio waves. In various embodiments, the antenna interface controller may support EDGE, W-CDMA, HSPA, LTE, CDMA-2000 network communication modes.

The one or more processors 206 and the memory 208 of the router 108(1) may implement an operating system 212, device software 214, and the agent application 110. The operating system 212 may include components that enable the router 108(1) to receive and transmit data via various interfaces (e.g., user controls, communication interface 202, and/or memory input/output devices). The operating system 212 may also process data using the one or more processors 206 to generate outputs based on inputs that are received via the device interface 204. For example, the operating system 212 may provide an execution environment for the execution of the device software 214. The operating system 212 may include a presentation component that presents the output (e.g., display the data on an electronic display, store the data in memory, transmit the data to another electronic device, etc.). Additionally, the operating system 212 may include other components that perform various other functions generally associated with an operating system. The device software 214 may include software components that enable the user device to perform functions. For example, the device software 214 may include, bootrom, or a bootloader that boots up the router 108(1) and executes the operating system 212 following power up of the device.

The agent application 110 may manage the download and installation of router updates for the router 108(1). Accordingly, the agent application 110 may include a secure communication module 216, an update request module 218, an update module 220, and a control interface module 222. Each of the modules may include routines, program instructions, objects, and/or data structures that perform particular tasks or implement particular abstract data types. The agent application 110 may have access to a secure storage 224. The secure storage 224 may be an isolated memory space of the memory 208 that is accessible solely by the agent application 110. Accordingly, the isolation of the secure storage 224 may provide a high level of security for the data stored in the memory space. For example, the data stored in the secure storage 224 may include update available notifications 226 that are received from the router management engine 114, as well as router updates 228 that are downloaded from the router management engine 114.

The secure communication module 216 may provide a secure communication session for communicating with the router management engine 114. In various embodiments, the secure communication module 216 may enable the agent application 110 to send and receive data to the router management engine 114 via the secure communication sessions. For example, the update request module 218 may use the secure communication module 216 to send requests for router updates to and receive update available notifications from the router management engine 114. In another example, the update module 220 may use the secure communication module 216 to request and receive router downloads.

In some embodiments, the secure communication module 216 may use Hypertext Transfer Protocol (HTTP) over Transport Layer Security (TLS) (HTTPS) to implement the communication sessions. In at least one implementation, the secure communication module 216 may contact a server 112 for a secure connection. The server 112 may send back a digital certificate that verifies an identity of the server 112. For example, the digital certificate may contain the server name, the trusted certificate authority (CA), and the public key of the server. The public key may be part of an asymmetric encryption public-private key pair that is used by the server 112 to perform asymmetric encryption. The public key may be stored in advance in the secure storage 224.

After the secure communication module 216 has validated the digital certificate of the server 112 with the CA, the secure communication module 216 may encrypts a shared secret (e.g., a random number) with the public key. The result of the encryption is then sent to the server 112 for decryption into the shared secret using the private key of the public-private key pair. Subsequently, the shared secret is used by the secure communication module 216 and the server 112 to generate one or more unique session keys for subsequent encryption and decryption of data during the session. Accordingly, communications between secure communication module 216 and the router management engine 114 in a secure communication session may be encrypted using the one or more unique session keys until the secure communication session terminates. Alternatively, the secure communication module 216 and the server 112 may use Diffie-Hellman key exchange to securely generate unique session keys for encryption and decryption during the secure communication session. In other embodiments, the secure communication module 216 may secure the data that is exchanged between the agent application 110 and the router management engine 114 by authenticating and encrypting the internet protocol (IP) packets of communication sessions using Internet Protocol Security (IPsec).

The update request module 218 may periodically check for new router updates from the router management engine 114 at predetermined intervals. In various embodiments, the update request module 218 may send an update request to the router management engine 114 via the Internet 132. The update request may include the identification information of the router 108(1), such as a MAC address of the router, an ESN of the router, or some other unique identifier of the router. In some instances, the update request may include information on the software that is installed on the router 108(1). For example, the information may include a firmware version, device feature settings, location information (e.g., source network location, domain name, etc.), device diagnostic data (e.g., error logs, device up time, etc.), and/or so forth. In turn, the router management engine 114 may store such information into the router profile database 126. The router management engine 114 may further determine whether a router update is available for the router 108(1) based on the information received from the update request module 218. Accordingly, if the router management engine 114 determines that a router update is available, the router management engine 114 may transmit an update available notification to the update request module 218 via the Internet 132. The update available notification may contain information such as the type of update, i.e., firmware update, feature disablement or activation update, a security update, etc. The update available notification may include a network location at which the router update may be downloaded.

Following the receipt of an update available notification from the router management engine 114, the update request module 218 may send an acknowledgement message to the router management engine 114. Further, the update request module 218 may activate one or more visual or audio alert components of the router 108(1). For example, the update request module 218 may trigger a specific indicator light or a specific patterns of indicator lights to be lit or flash on the router 108(1). Alternatively or concurrently, the update request module 218 may trigger a speaker or a tone generator of the router 108(1) to produce a specific sound or a melody of sounds. Such visual or audio alerts may serve to inform a user of the router 108(1) that an update to the router is available. In some instances, the update date request pattern of lights or melody of sounds triggered by the update request module 218 may be different depending on the type of the router update. Accordingly, the user may use a device configuration interface provided by the control interface module 222 to initiate a download and installation of the router update. In some embodiments, the receipt of the update available notification may also trigger a timer that is built into the update request module 218. Accordingly, if no manual download and installation of the router update is triggered within a predetermined time period, the update request module 218 may automatically trigger the update module 220 to download and install the router update even without any user initiation.

In additional embodiments, the update request module 218 may also receive update available notifications that are initiated by the router management engine 114. In various embodiments, such update available notifications may be sent to the router 108(1) as push notifications via the Internet 132, or as text messages via the cellular communication connection 136. Accordingly, such update available notifications are displayed by the update request module 218 to a user via audio and/or visual alerts provided by the router 108(1). Further, the update request module 218 may also trigger the update module 220 to download and install a router update if no user action is taken with respect to a corresponding update available notifications within a predetermined time period.

The update module 220 may download and install router updates to the router 108(1) in response to a request received from a device configuration interface or the update request module 218. In various embodiments, the update module 220 may use a network location link that is embedded in a received update available notifications to access a corresponding remote storage location on the wireless carrier network 102 that is managed by the router management engine 114. For example, the storage location may be the router update store 128 at which a corresponding router update may be stored. Accordingly, the update module 220 may download the router update from the remote storage location. Following the download of the router update, the update module 220 may implement the router update onto the router 108(1). The router update may be a new firmware update, a feature update that enables or disables one or more features of the router 108(1), or a security update that entirely disables the functionalities of the router 108(1).

The control interface module 222 may be used to access a device configuration interface of the router 108(1). For example, the device configuration interface may be a localized web page accessible via a web browser. The device configuration interface may enable a user to modify the multiple router settings of the router 108(1), as well as initiate router updates. For example, upon receiving an update available notification for a particular router update, the device configuration interface may provide an update menu. The update menu may include information regarding the particular router update, as well as an update control that may be used to download and implement the particular router update.

Example Server Components

Figure 3:
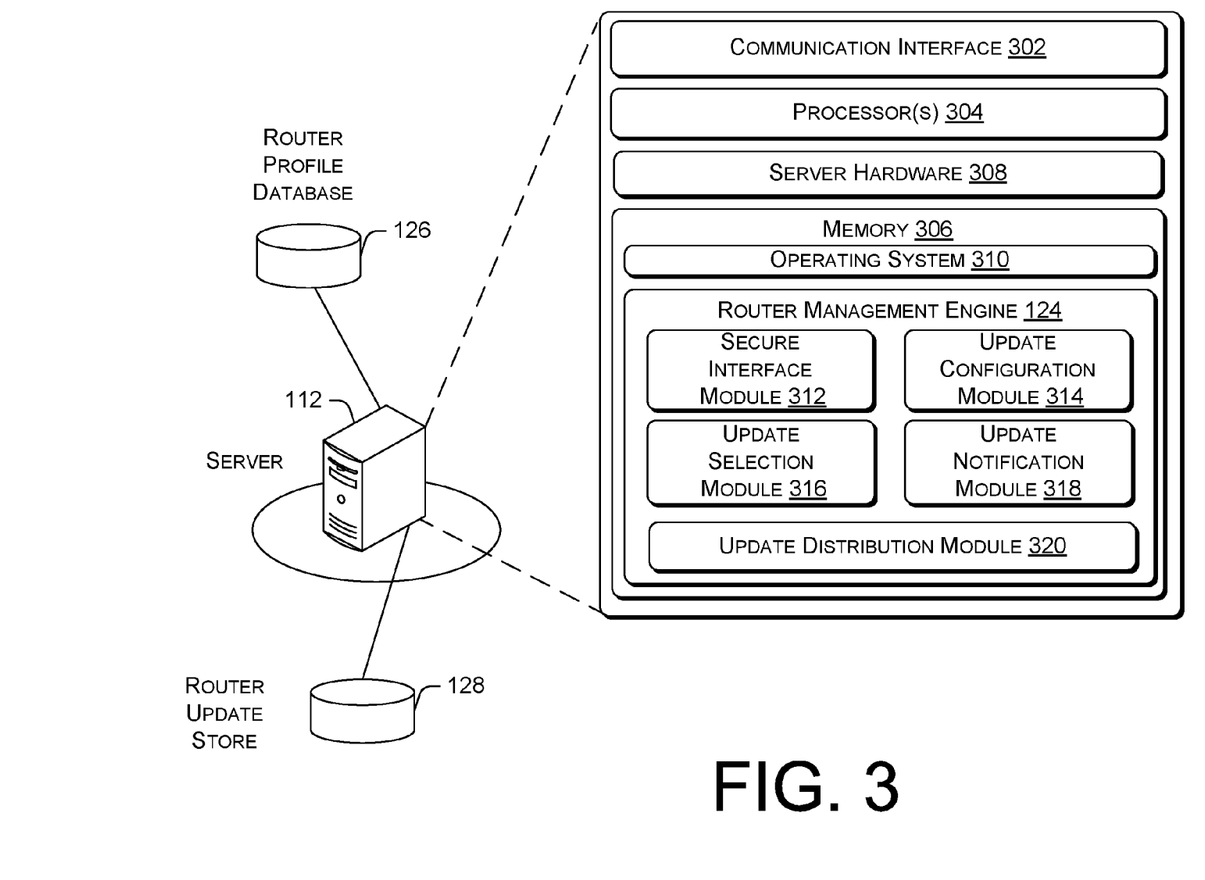
FIG. 3 is a block diagram showing various components of an illustrative server that implements selective updates for Wi-Fi calling capable routers.

FIG. 3 is a block diagram showing various components of an illustrative server that implements selective updates for Wi-Fi calling capable routers. The server 112 may include a communication interface 302, one or more processors 304, memory 306, and server hardware 308. The communication interface 302 may include wireless and/or wired communication components that enable the server to transmit data to and receive data from other networked devices. The server hardware 308 may include additional hardware that performs interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the server 112 may implement an operating system 310 and the router management engine 114. The operating system 310 may include components that enable the server 112 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The router management engine 114 may include a secure interface module 312, an update configuration module 314, an update selection module 316, an update notification module 318, and an update distribution module 320. Each of the modules may include routines, program instructions, objects, and/or data structures that perform particular tasks or implement particular abstract data types.

The secure interface module 312 may cooperate with the secure communication module 216 of the agent application 110 to establish secure communication sessions. The secure communication sessions may be used by the router management engine 114 to exchange data with routers, such as the router 108(1). In various embodiments, the secure communication sessions may include HTTPS and IPSec protected communication sessions.

The update configuration module 314 may be used by an administrator to designate router updates for specific groups of routers. In various embodiments, the administrator may specify a group of routers by selecting one or more router parameters that are to be shared by the group via the interface application 118. Once a group of routers has been specified, the administrator may then use the update configuration module 314 to designate a particular router update that is to be distributed to the group of routers. For example, the administrator may designate a firmware update for a group of routers with a particular model number, as the firmware update may fix a security vulnerability in the routers with that particular model number.

In another example, the update configuration module 314 may be used specify a device feature update is to be made available to a group of routers that are being used in a particular geographical area, provided that the routers are leased rather than purchased from the wireless communication carrier. In such an example, the device feature update may activate or disable a feature of the routers in order to enhance the performance of routers in the particular geographical area. In an additional example, the administrator may use the update configuration module 314 to designate a particular router update for a group of routers that are used by users with postpaid account. In another more simplistic example, a group as designated using update configuration module 314 may be a router with a particular router identifier (e.g., a MAC address) routers with a range of router identifiers (e.g., a range of MAC addresses), a router associated with a telephone number, or routers associated with a range of telephone numbers.

The update selection module 316 may be used to query the router profile database 126 for routers that belong to the different groups that are designated via the update configuration module 314. The different groups of routers may have corresponding available router updates that are stored in the router update store 128. In at least one embodiment, an administrator may select a particular pre-specified group. In turn, the update selection module 316 may search the router profile database 126 for one or more router profiles having the one or more parameters that are designated for the particular pre-specific group. Once the router profiles with one or more parameters that fit into the group are identified, the update selection module 316 may display the corresponding routers via the interface application 118. The interface application 118 may further display an option for sending update available notifications regarding the availability of the router update to the routers that fit into the pre-specified group.

Alternatively, the update selection module 316 may receive a request for a router update from a router. The router request may include router identification information for the requesting router. Accordingly, the update selection module 316 may retrieve a corresponding router profile from the router profile database 126. Subsequently, the update selection module 316 may compare the one or more router parameters listed in the router profile to the router parameters specified for one or more groups of routers with available router updates. Accordingly, if the update selection module 316 determines that the router profile of the requesting router includes parameter(s) that match parameter(s) of a group with an available router update, the update selection module 316 may use the update notification module 318 to send an update available notification to the requesting router. In some instances, the parameter(s) of a router used for comparison to the parameter(s) of the groups by the update selection module 316 may be designated by a user.

The update notification module 318 may send update available notifications to routers that belong to different groups. The notifications may be sent in response to a command from the update selection module 316 or in response to a user initiation. An update available notification may be sent to a router in multiple ways. In some implementations, the update notification module 318 may send a push notification to a router via the Internet 132. In other implementations, a router may be a subscriber identity equipped module (SIM)-equipped router that has a cellular communication connection 136 to the wireless carrier network 102. In such implementations, the update notification module 318 may send the update available notification as a text message, such as a short messaging service (SMS) message, to the router via the cellular communication connection.

In alternative implementations, the update notification module 318 may send the update available notification for a router as a text message to a user device that is known to be associated with the router. For example, the user device 138 may belong to a user that is also leases or owns the router 108(1). In some embodiments, the particular communication channel that is used to send an update available notification may be designated by an administrator via the interface application 118. In other embodiments, the update notification module 318 may send the update available notification to a router using a hierarchy of communication channels until the update available notification is successfully delivered to the router. In one implementation, the update notification module 318 may first use the Internet 132 to deliver the notification. If such delivery is unsuccessful, the update notification module 318 may attempt to use cellular communication connection 136 to send the notification to the router. In the event that is also unsuccessful, the update notification module 318 may send the notification to a user device, such as the user device 138, that is associated with the router. However, other implementation may use different hierarchies of these communication channels to send the notification.

The update distribution module 320 may distribute router updates to multiple routers. In various embodiments, an agent application on the router may send a download request to the update distribution module 320 that includes the network location of the router update in the router update store 128. The update distribution module 320 may verify that the network location as presented by the requesting router is valid, i.e., the network locations exists for the router update. If the network location is validated, the update distribution module 320 may permit the router to download the router update that is stored at the network location of the router update store 128. However, if the update distribution module 320 determines that the network location is invalid, the update distribution module 320 may send an update error message to the agent application on the router.

In some embodiments, the download request of a router may also include the identification information of the router. Accordingly, the update distribution module 320 may use the update selection module 316 to perform a router validation check by retrieving the router profile of the router based on the identification information. Subsequently, the update selection module 316 may compare the router profile of the router to the one or more parameters of the group that corresponds to the router update to ensure that the router still qualifies for the router update. Accordingly, if the update selection module 316 determines that the router still qualifies, the update distribution module 320 may permit the router to download the router update that is stored at the network location of the router update store 128. Otherwise, the update distribution module 320 may send an update error message to the agent application on the router. In still other embodiments, the update distribution module 320 may perform both the network location validation check and the router validation check prior to permitting the router to download the router update that is stored at the network location of the router update store 128.

Example Processes

FIGS. 4-7 present illustrative processes 400-700 for implementing selective updates for Wi-Fi calling capable routers. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the network architecture 100 of FIG. 1.

Figure 4:
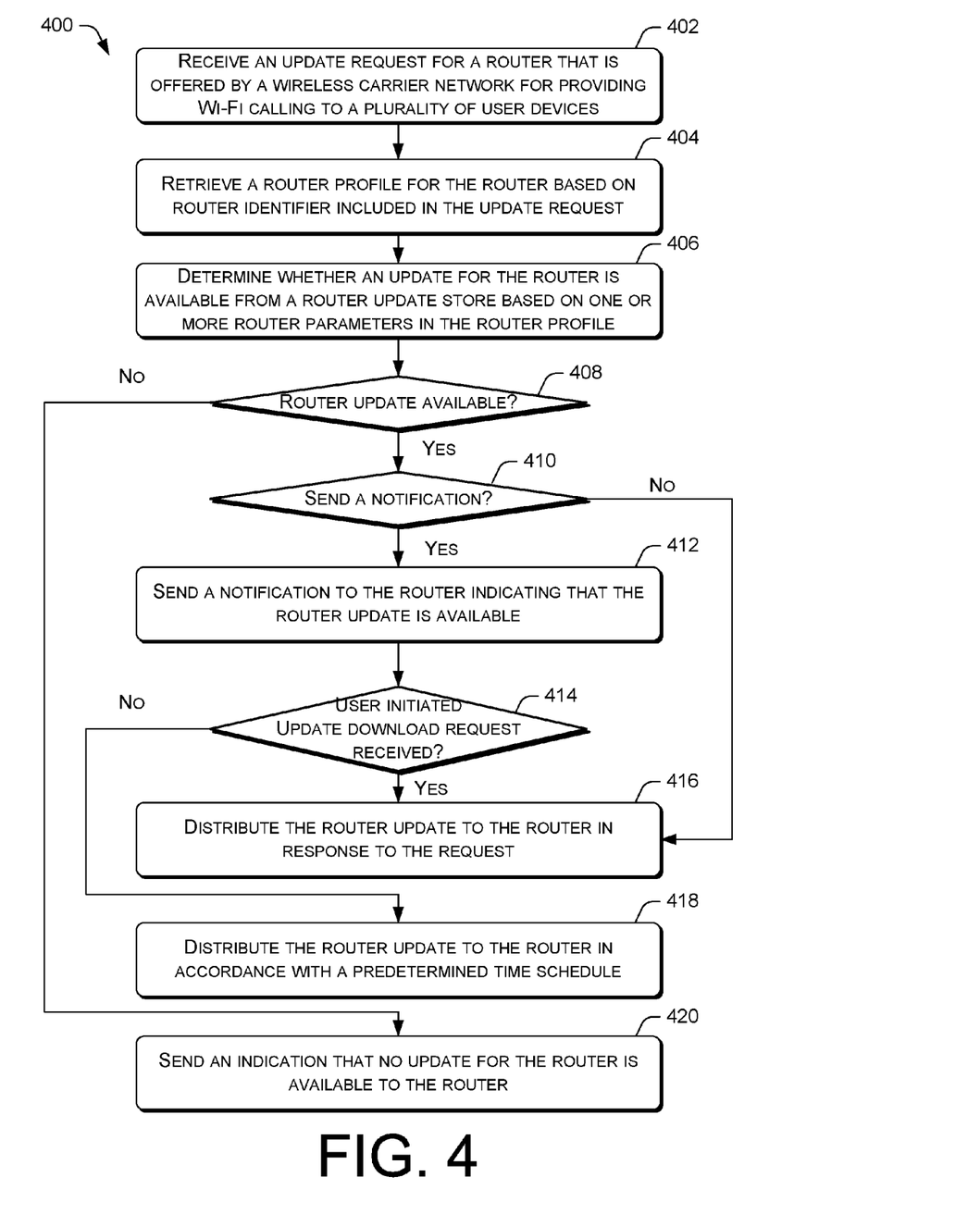
FIG. 4 is a flow diagram of an example process for selectively sending a router update to a Wi-Fi calling capable router based on a router profile of the router.

FIG. 4 is a flow diagram of an example process 400 for selectively sending a router update to a Wi-Fi calling capable router based on a router profile of the router. At block 402, the router management engine 114 may receive an update request for a router. The router may be offered by the wireless carrier network 102 for providing Wi-Fi calling capability to a plurality of user devices. In various embodiments, the update request may be initiated by a router or manually by an administrator 116 at the operator terminal 120.

At block 404, the router management engine 114 may retrieve a router profile for the router based on a router identifier included in the update request. In various embodiments, the device identifier may be an ESN, an IMSI number, or a MAC address of the device. The router profile of the router may include geolocation parameters, device parameters, account parameters, and possessory parameters.

At block 406, the router management engine 114 may determine whether a router update for the router is available from the router update store 128 based on the one or more router parameters in the router profile. In various embodiments, the router management engine 114 may compare the one or more router parameters listed in the router profile to the router parameters specified for one or more groups of routers with available router updates.

At decision block 408, the router management engine 114 may determine whether a router update is available for the router. The router management engine 114 may determine that a router update is available when the parameter(s) in a router profile of the router matches parameter(s) of a group with an available router update. Accordingly, if the router management engine 114 determines that a router update is available ("yes" at decision block 408), the process 400 may proceed to decision block 410.

At decision block 410, the router management engine 114 may determine whether to send an update available notification to the router. In various embodiment, the router management engine 114 may skip the sending of the notification if the update request is initiated by the router in response to a request activation from the user. Otherwise, the router may send the update available notification to the router. Accordingly, if the router management engine 114 determines that a notification is to be sent ("yes" at decision block 410), the process 400 may proceed to block 412. At block 412, the router management engine 114 may send the notification to the router to indicate that the router update is available for the router. Subsequently, the process 400 may proceed to decision block 414.

At decision block 414, the router management engine 114 may determine whether an update download request is received from the router. In various embodiments, the update download request may be initiated by a user at the router in response to the update available notification. Accordingly, if the router management engine 114 determines that an update download request is received ("yes" at decision block 414), the process 400 may proceed to block 416.

At block 416, the router management engine 114 may distribute the router update to the router in response to the request. In various embodiments, the router update may be a new firmware update, a feature update that enables or disables one or more features of the router, or a security update that entirely disables the functionalities of the router. However, if the router management engine 114 determines that no update download request is received ("no" at decision block 414), the process 400 may proceed to block 418. At block 418, the router management engine 114 may distribute the router update to the router accordance with a predetermined time schedule. In various embodiments, the time schedule may be determined by the router that automatically initiates the download of the router update from the router management engine 114.

Returning to decision block 408, if router management engine 114 determines that no router update is available ("no" at decision block 408), the process 400 may proceed to block 420. At block 420, the router management engine 114 may send an indication to the router indicating that no update for the router is available. Returning to decision block 410, if the router management engine 114 determines that no notification is to be sent ("no" at decision block 410), the process 400 may proceed directly to block 416.

Figure 5:
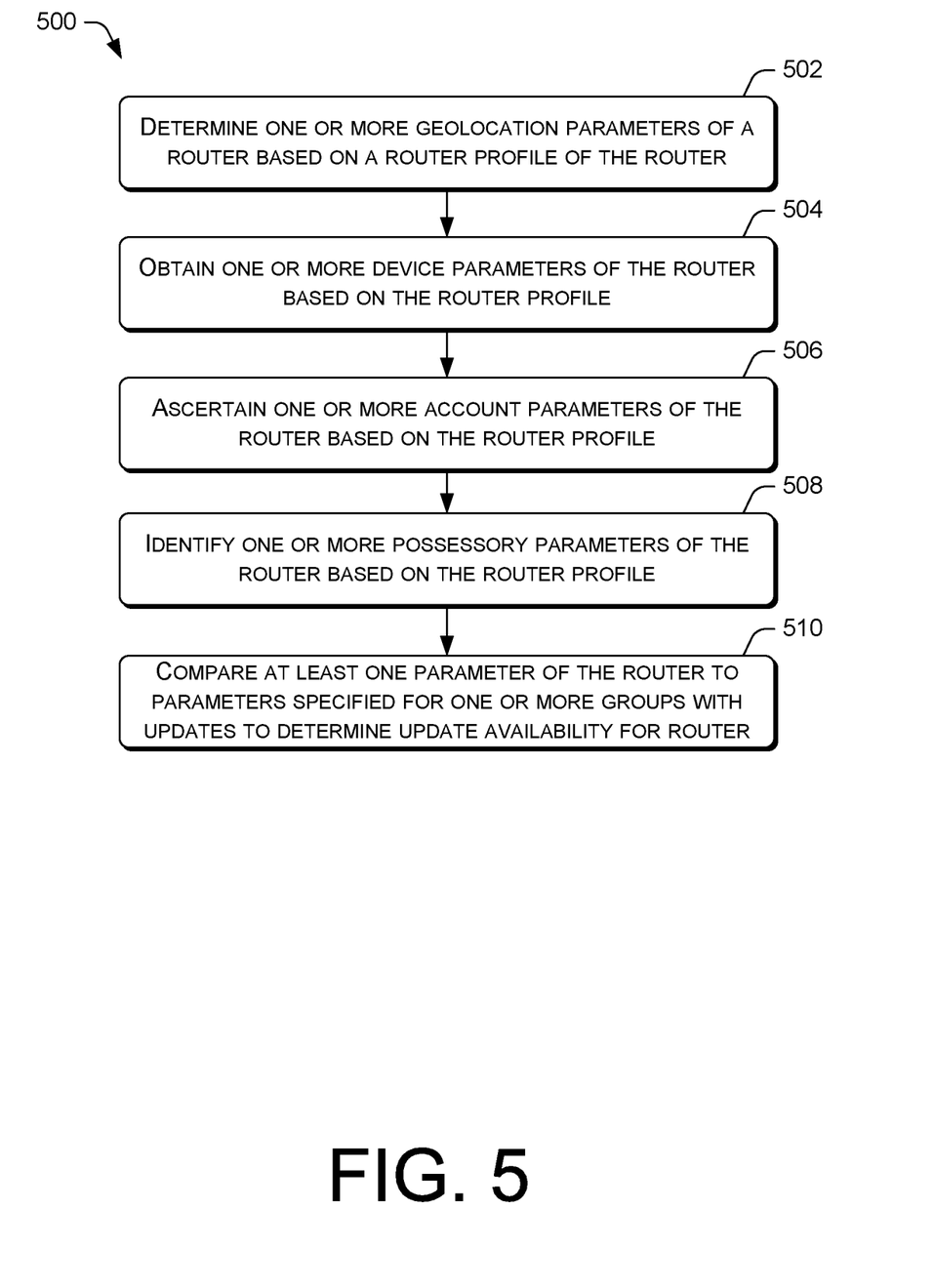
FIG. 5 is a flow diagram of an example process for sending a router update to a Wi-Fi calling capable router via an available communication channel.

FIG. 5 is a flow diagram of an example process 500 for sending a router update to a Wi-Fi calling capable router via an available communication channel. The process 500 may further illustrate block 406 of the process 400. At block 502, the router management engine 114 may determine one or more geolocation parameters of a router based on a router profile of the router. The router management engine 114 may obtain the router profile from a router profile database 126. In various embodiments, the geolocation parameters of the router may include a specific city, a specific state, and/or a specific market at which the router is located.

At block 504, the router management engine 114 may obtain one or more device parameters of the router based on the router profile of the router. In various embodiments, the device parameters may include a firmware version, a device model, a hardware version, and/or so forth.

At block 506, the router management engine 114 may ascertain one or more billing account parameters of the router based on the router profile. The account parameters may indicate whether the account is a prepaid customer account or a postpaid customer account. The account parameters may further indicate whether a user using a router is up-to-date or behind on the payment of recurring (e.g., monthly, weekly) service fees. The account parameter may further include a telephone number that is associated with the account.

At block 508, the router management engine 114 may identify one or more possessory parameters of the router based on the router profile of the router. In various embodiments, the possessory parameters may indicate whether the router is a leased router or that the router has been purchased by a user. In some instances, the possessory parameters may further indicate the payment terms associated with the lease or the purchase.

At block 510, the router management engine 114 may determine whether an update for the router is available for the router from the router update store based on at least one parameter of the router. In various embodiments, the router management engine 114 may determine that a router update is available when the at least one parameter of the router matches one or more corresponding parameters that are associated with a router group that has an available router update. In some instances, the parameter(s) of the router used for comparison to the parameter(s) of each router group may be designated by a user.

Figure 6:
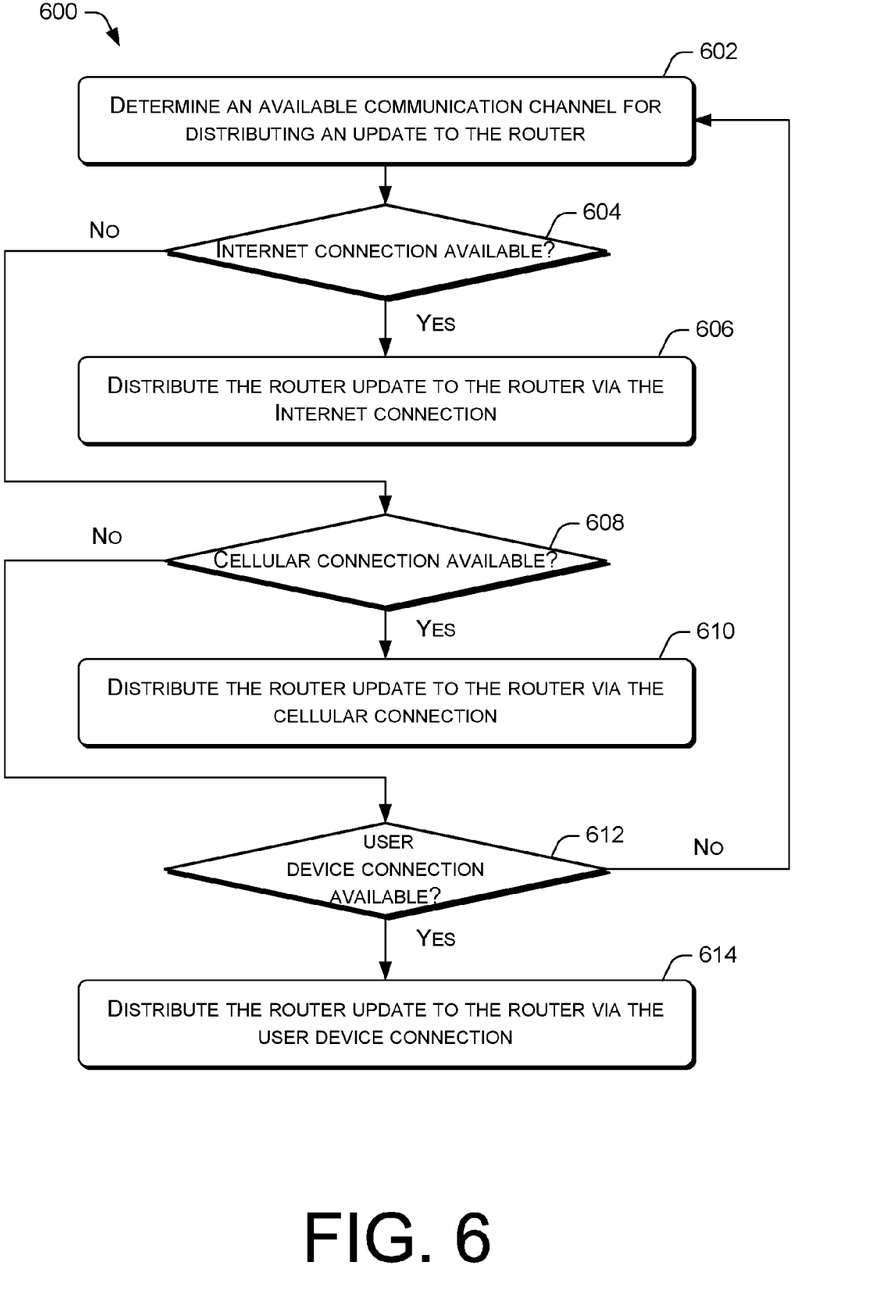
FIG. 6 is a flow diagram of an example process for triggering the installation of a remote support client application on a user device based on multiple factors.

FIG. 6 is a flow diagram of an example process 600 for triggering the installation of a remote support client application on a user device based on multiple factors. At block 602, the router management engine 114 may determine an available communication channel for distributing a router update to the router. In various embodiments, the router update may be distributed via secure communication sessions, such as HTTPS or IPSec protected communication sessions, which are implemented using the available communication channel.

At decision block 604, the router management engine 114 may determine whether an Internet connection to the router is available. Accordingly, if the router management engine 114 determines that the Internet connection is available ("yes" at decision block 604), the process 600 may proceed to 606. At block 606, the router management engine 114 may distribute the router update via the Internet connection. In some embodiments, the distribution of the router update may include sending the router update to the router via the Internet connection. In other embodiments, the distribution of the router update may including sending an update available notification to the router via the Internet connection, such that the router update may be downloaded by the router using the Internet connection following the notification. However, if the router management engine 114 determine that the Internet connection is unavailable ("no" at decision block 604), the process 600 may proceed to decision block 608.

At decision block 608, the router management engine 114 may determine whether a cellular connection is available. Accordingly, if the router management engine 114 determines that the cellular connection is available ("yes" at decision block 608), the process 600 may proceed to 610. At block 610, the router management engine 114 may distribute the router update via the cellular connection. In some embodiments, the distribution of the router update may include sending the router update to the router via the cellular connection. In other embodiments, the distribution of the router update may including sending an update available notification to the router via the cellular connection, such that the router update may be downloaded by the router using the cellular connection following the notification. However, if the router management engine 114 determine that the cellular connection is unavailable ("no" at decision block 608), the process 600 may proceed to decision block 612.

At decision block 612, the router management engine 114 may determine whether a user device connection is available. Accordingly, if the router management engine 114 determines that the user device connection is available ("yes" at decision block 612), the process 600 may proceed to 614. At block 614, the router management engine 114 may distribute the router update via the user device connection. In various embodiments, the router management engine 114 may send an update available notification to the user device via a cellular connection with the user device, such that the router update may be downloaded by the router using the connected user device following the notification. However, if the router management engine 114 determine that the user device connection is unavailable ("no" at decision block 612), the process 600 may loop back to block 602.

Figure 7:
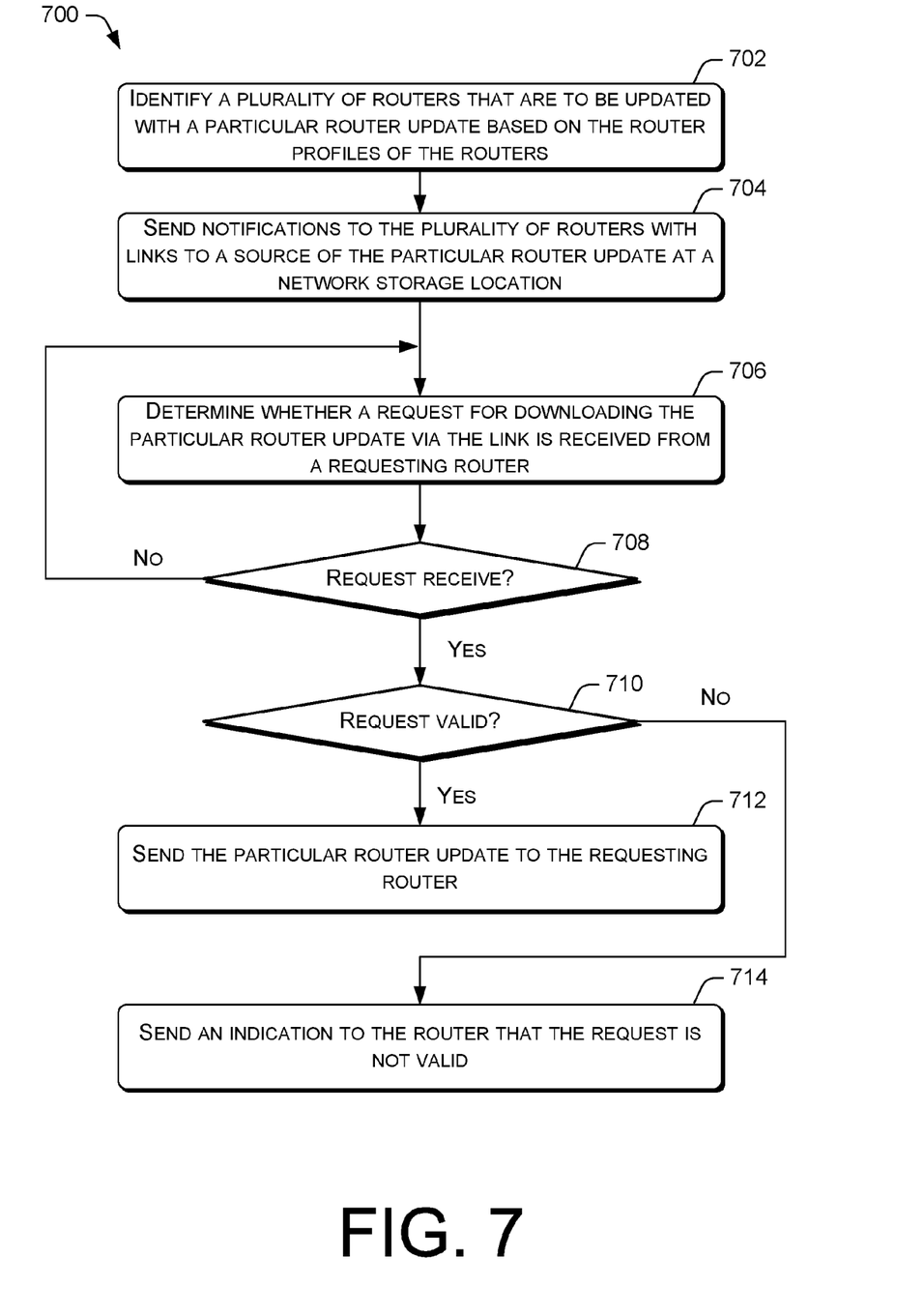
FIG. 7 is a flow diagram of an example process for selectively providing router updates to a group of Wi-Fi calling capable routers based on the router profiles of the routers.

FIG. 7 is a flow diagram of an example process 700 for selectively providing router updates to a group of Wi-Fi calling capable routers based on the router profiles of the routers. At block 702, the router management engine 114 may identify a plurality of routers that are to be updated with a particular router update based on the router profiles of the routers. In various embodiments, the router management engine 114 may query the router profiles that are stored in the router profile database 126 for router profiles with at least one parameter that matches one or more parameters of the particular router update. Accordingly, the router management engine 114 may identify a plurality of routers that are to be updated with the particular router update.

At block 704, the router management engine 114 may send notifications to the plurality of routers with links to a source of the particular router update at a network storage location. In various embodiments, the notifications may be sent to the routers as push notifications via the Internet 132, as text messages via cellular communication connections, or as text messages to user devices that are associated with the routers.

At block 706, the router management engine 114 may determine whether a request for downloading the particular router update via the link is received from a requesting router. In various embodiments, the download request may be initiated by a user using a configuration control of the router or a device agent on the router. Thus, at decision block 708, if the router management engine 114 receives a download request from a router ("yes" at decision block 708), the process 700 may proceed to decision block 710.

At decision block 710, the router management engine 114 may determine whether the download request presented by the router is valid. In some embodiments, the download request may be determined to be valid when a network storage location linked to by the download request still contains the router update. In other embodiments, the download request may be determined to be valid when the network storage location still contains the router update and the router still qualifies for the router update. Accordingly, if the router management engine 114 determines that the download request presented by the router is valid ("yes" at decision block 710), the process 700 may proceed to block 712.

At block 712, the router management engine 114 may send the particular router update to the request router. In various embodiments, the router update may be sent to the router as via the Internet 132, a cellular communication connection, or via a user device that is associated with the router.

Returning to decision block 708, if the router management engine 114 does not receive a download request from a router ("no" at decision block 708), the process 700 may loop back to block 706. Returning to decision block 710, if the router management engine 114 determines that the download request presented by the router is invalid ("no" at decision block 710), the process 700 may proceed to block 714. At block 714, the router management engine 114 may send an indication to the router that the request is not valid.

The selective provisioning of specific groups of routers with different router updates may enhance router security, provide differentiated router-based services for different users, and enable a wireless communication carrier to provide competitive router-based features in specific markets while minimizing overall operating costs. The enhancement of router services and router security may reduce customer service support cost and time, as well as increase customer satisfaction and customer retention.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a router update request for a router that is offered by a wireless carrier network for providing Wi-Fi calling to one or more user devices;
   retrieving a router profile for the router from a router profile database of the wireless carrier network based on a router identifier included in the router update request;
   determining whether a router update for the router is available from a router update store of the wireless carrier network based on one or more router parameters in the router profile;
   distributing the router update to the router in response to a router update being available from the router update store of the wireless carrier network; and
   sending a router update unavailable indication to the router in response to the router update being unavailable from the router update store of the wireless carrier network.

2. The one or more non-transitory computer-readable media of claim 1, wherein the distributing includes distributing the route update to a secure storage of the router that is an isolated memory space in the router accessible solely by an agent application that initiated the router update request.

3. The one or more non-transitory computer-readable media of claim 1, wherein the acts further comprise sending a router update available notification to the router, and wherein the distributing includes distributing the router update in response to the router update being available and receiving a user initiated update download request as a result of the router update available notification, or distributing the router update to the router according to a predetermined time schedule in response to the router update being available and a lack of the user initiated update download request resulting from the router update available notification.

4. The one or more non-transitory computer-readable media of claim 3, wherein the router update available notification is sent to the router via an Internet connection or via a cellular communication connection between the router and the wireless carrier network, and where the router update available notification causes the router to provide a visual or an audio alert that indicates the router update is available.

5. The one or more non-transitory computer-readable media of claim 3, wherein the router update available notification is sent to a user device via a cellular communication connection, the user device belonging to a user that is provided with the router by the wireless carrier network.

6. The one or more non-transitory computer-readable media of claim 1, wherein the router update request is a periodic update request that is initiated by the router or an update request that is manually initiated by an administrator of the wireless carrier network.

7. The one or more non-transitory computer-readable media of claim 1, wherein the router update includes at least one of a new firmware update for the router, a feature update that enables or disable one or more features of the router, or a security update that disables all functionalities of the router.

8. The one or more non-transitory computer-readable media of claim 1, wherein the determining includes:
   determining one or more geolocation parameters of the router based on the router profile of the router, the one or more geolocation parameters indicating at least one of a specific city, a specific state, or a specific market at which the router is located;
   obtaining one or more device parameters of the router based on the router profile, the one or more device parameters indicating at least one of a firmware version, a device model, or a hardware version of the router;
   ascertaining one or more account parameters associated with the router based on the router profile of the router, the one or more account parameters indicating at least one of whether an account associated with the router is a prepaid customer account or a postpaid customer account, whether a user using the router is up-to-date or behind on recurring payments for services, or a telephone number that is associated with the account;
   identifying one or more possessory parameters associated with the router based on the router profile of the router, the one or more possessory parameters indicating whether the router is leased or purchased from the wireless carrier network; and
   comparing at least one parameter of the router to parameters specified for one or more groups with router updates to determine whether the router update is available for the router.

9. The one or more non-transitory computer-readable media of claim 1, wherein the distributing includes distributing the router update to the router via an Internet connection between the router and the wireless carrier network, a cellular communication connection between the router and the wireless carrier network, or a user device that is directly connected to the router.

10. The one or more non-transitory computer-readable media of claim 1, wherein distributing includes distributing the router update via a connection between a server of the wireless carrier network and the router via one of a Hypertext Transfer Protocol (HTTP) over Transport Layer Security (TLS) (HTTPS) or Internet Protocol Security (IPsec).

11. A computer-implemented method, comprising:
   identifying, at a server of a wireless carrier network, a plurality of routers that are to be updated with a particular router update based on router profiles of the plurality of routers, the plurality of routers belonging to a group of routers that share one or more parameters, the particular router update being specifically tailored for the group of routers;
   sending router update available notifications from the server to the plurality of routers with links to a source of the particular router update at a network storage location of the wireless carrier network;
   receiving, at the server, a download request from a router of the plurality of routers to download the particular router update from the network storage location of the wireless carrier network; and
   sending the particular router update to the router following a validation of the download request from the router at the server of the wireless carrier network.

12. The computer-implemented method of claim 11, wherein the validation of the download requesting includes at least one of validating that the network storage location corresponding to a link still contains the particular router update or verifying based on a router profile of the router that the router still has the one or more parameters of the group of routers.

13. The computer-implemented method of claim 11, wherein the identifying includes:
   determining one or more geolocation parameters of the router based on a router profile of the router, the one or more geolocation parameters indicating at least one of a specific city, a specific state, or a specific market at which the router is located;
   obtaining one or more device parameters of the router based on the router profile, the one or more device parameters indicating at least one of a firmware version, a device model, or a hardware version of the router;
   ascertaining one or more account parameters associated with the router based on the router profile of the router, the one or more account parameters indicating at least one of whether an account associated with the router is a prepaid customer account or a postpaid customer account, whether a user using the router is up-to-date or behind on recurring payments for services, or a telephone number that is associated with the account;
   identifying one or more possessory parameters associated with the router based on the router profile of the router, the one or more possessory parameters indicating whether the router is leased or purchased from the wireless carrier network; and
   comparing at least one parameter of the router to the one or more parameters of the group of routers with the particular router update to determining whether the router belongs to the group of routers.

14. The computer-implemented method of claim 11, wherein the identifying includes identifying the plurality of routers in response to a request from an administrator of the wireless carrier network.

15. The computer-implemented method of claim 11, wherein the particular router update includes at least one of a new firmware update for the router, a feature update that enables or disable one or more features of the router, or a security update that disables all functionalities of the router.

16. The computer-implemented method of claim 11, wherein a router update available notification is sent to the router via an Internet connection or via a cellular communication connection between the router and the wireless carrier network, and where the router update available notification causes the router to provide a visual or an audio alert that indicates the particular router update is available.

17. The computer-implemented method of claim 11, wherein the sending the particular router update includes sending the particular router update via a connection between a server of the wireless carrier network and the router via one of a Hypertext Transfer Protocol (HTTP) over Transport Layer Security (TLS) (HTTPS) or Internet Protocol Security (IPsec).

18. A system, comprising:
one or more processors; and
memory including a plurality of computer-executable components that are executable by the one or more processors to perform a plurality of actions, the plurality of actions comprising:
receiving a router update request for a router that is offered by a wireless carrier network to a user for providing Wi-Fi calling to a plurality of user devices of the user;
retrieving a router profile for the router from a router profile database of the wireless carrier network based on a router identifier included in the router update request;
determining whether a router update for the router is available from a router update store of the wireless carrier network based on one or more parameters in the router profile by comparing the one or more parameters to parameters belonging to groups of routers with router updates to determining whether the router belongs to a group with an available router update;
distributing the router update to the router in response to a router update being available from the router update store of the wireless carrier network; and
sending a router update unavailable indication to the router in response to the router update being unavailable from the router update store of the wireless carrier network.

19. The system of claim 18, wherein the plurality of actions further comprise sending a router update available notification to the router, and wherein the distributing includes distributing the router update in response to the router update being available and receiving a user initiated update download request as a result of the router update available notification, or distributing the router update to the router according to a predetermined time schedule in response to the router update being available and a lack of the user initiated update download request resulting from the router update available notification.

20. The system of claim 18, wherein router parameters in the router profile includes at least one of one or more geolocation parameters indicating at least one of a specific city, a specific state, or a specific market at which the router is located, one or more device parameters indicating at least one of a firmware version, a device model, or a hardware version of the router, one or more account parameters indicating at least one of whether an account associated with the router is a prepaid customer account or a postpaid customer account, whether a user using the router is up-to-date or behind on recurring payments for services, or a telephone number that is associated with the account, or one or more possessory parameters indicating whether the router is leased or purchased from the wireless carrier network.

* * * * *